(12) United States Patent
Boice et al.

(10) Patent No.: US 6,269,120 B1
(45) Date of Patent: Jul. 31, 2001

(54) METHOD OF PRECISE BUFFER MANAGEMENT FOR MPEG VIDEO SPLICING

(75) Inventors: Charles E. Boice, Endicott; Barbara A. Hall; Agnes Y. Ngai, both of Endwell; Edward F. Westermann, Endicott, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/046,288

(22) Filed: Mar. 23, 1998

(51) Int. Cl.$^7$ ....................................... H04N 7/12
(52) U.S. Cl. ....................................... 375/240.12
(58) Field of Search ................... 348/419, 384, 348/402, 423

(56) References Cited

U.S. PATENT DOCUMENTS

| | | | |
|---|---|---|---|
| 5,331,348 | * 7/1994 | Knauer et al. | 348/402 |
| 5,717,464 | * 2/1998 | Perkins et al. | 348/419 |
| 5,748,240 | * 5/1998 | Carr et al. | 348/384 |
| 5,793,431 | * 8/1998 | Blanchard | 348/423 |

* cited by examiner

Primary Examiner—Chris Kelley
Assistant Examiner—Allen Wong
(74) Attorney, Agent, or Firm—Scully, Scott, Murphy & Presser; John R. Pivnichny

(57) ABSTRACT

A method to insert or splice new pictures into an existing video stream is provided where the video stream is compressed according to the MPEG-2 video compression standard. The method assures that the new pictures will fit into the encoded stream in the space allotted without running over or under their given bit allocation. The method comprises of steps by which a number of new pictures may be encoded to a precise bit target given the number of free bits in the buffer at the start and end of the splicing, while preventing buffer overruns and under runs.

10 Claims, 2 Drawing Sheets

METHOD OF PRECISE BUFFER MANAGEMENT FOR MPEG VIDEO SPLICING

CROSS-REFERENCE TO RELATED APPLICATIONS

The following patent application is assigned to the assignee hereof and contains subject matter related to the subject matter of the present application:

U.S. patent application Ser. No. 09/046,285, entitled "A Precise Bit Control Apparatus with Look-ahead for MPEG Encoding", filed on even date herewith for John A. MURDOCK, Barbara A. HALL, Edward F. WESTERMANN, and Agnes Y. NGAI.

BACKGROUND OF THE INVENTION

1. Field of the Invention

The field of art to which this invention relates is insertion or splicing of digital video frames into input video sequence. Specifically, this invention relates to splicing new video frames into a compressed digital video sequence while maintaining Video Buffer Verifier (VBV) integrity as required, in order to have MPEG-2 compliant streams.

2. Description of the Related Art

Within the past decade, the advent of world wide electronic communications systems has enhanced the way in which people can send and receive information. In particular, the capabilities of real-time video and audio systems have greatly improved in recent years. To provide services such as video-on-demand, video conferencing, and multimedia communications to subscribers, an enormous amount of a network bandwidth is required. In fact, a network bandwidth is often the main inhibitor in the effectiveness of such systems.

To overcome the constraints imposed by networks, compression systems have emerged. These systems reduce the amount of video and/or audio data that must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, and variable length coding, all of which are well known in the art. Video compression between pictures is accomplished via a process referred to as motion estimation and compensation, in which a motion vector is used to describe the translation of a set of picture elements from one picture to another picture. Motion compensation takes advantage of the fact that video sequences are most often highly correlated in time, each frame in any given sequence may be similar to the preceding and following frames. These motion estimation and compensation techniques are also well known in the art.

To carry out the video compression, an encoder scans subsections within each frame, called macro blocks, and identifies which ones will not change position from one frame to the next. The encoder also identifies reference macro blocks while noting their position and direction of motion, and assigns a motion vector that identifies the motion of the reference block from one frame to another. Only the motion vector between each reference macro block and the affected current macro block is transmitted to the decoder. The decoder stores the information that does not change from frame to frame in its buffer memory and uses it to periodically fill in the macro blocks of the frame that do not change. The video sequence is subsequently decompressed and displayed close enough to the original video sequence to be acceptable for most viewing.

The MPEG-1 standard was introduced to handle the compressed digital representation of non video sources of multimedia. Subsequently it was adapted for the transmission of video signals as long as the video material was first converted from interlaced to progressively scanned format. That standard was adapted to transmit the compressed data bit stream at a rate (bandwidth) of 1.5 MBits per second, which is the rate of the uncompressed audio, CD and DAT.

The MPEG-2 standard was developed to produce higher quality images at bit rates of 3 to 10 MBits per second, for moving images of various applications such as digital storage and communication. The MPEG-2 standard supports both video material in interlaced or progressively scanned formats.

MPEG utilizes the interframe compression that builds reference frames so that subsequent frames can be compared with their previous and following frames. Interframe compression thus allows greater compression ratios because only the difference between frames is stored. That is to say, the encoder/codec can compress the video better because it does not have to store every frame of information-only what is unique to each frame.

An MPEG stream accomplishes this compression by using three types of frames: I or intra frames, P or predicted frames, and B or bidirectional frames. Intraframes are the only full frames in an MPEG stream, containing enough information to qualify them as entry points in the stream via random access. Intraframes are thus the largest of the frames. Predicted frames are based on a previous frame, either an intra or predicted frame, in turn becoming eligible for reference by following predicted frames. Since only the changes between the new frame and the reference frame need to be saved, the predicted frames are usually highly compressed. Bidirectional frames refer to both a future and previous frame, and are the most highly compressed frames in the stream. Because they contain so little information, they are never used as a reference frame for other frames.

Since the MPEG stream comprises only a few full frames, namely infrequent I frames, editing of the MPEG stream with frame accuracy is difficult. Most video is edited before encoding, which means that the edited sequence must be printed out to video losing a crucial generation before encoding.

In video encoding, users will often need to replace, insert or splice frames into an existing encoded video stream. A problem arises in assuring that the new encoded frames will fit into the encoded stream in the space allotted without running over their given bit allocation.

Therefore, it is an object of the present invention to provide a method by which a defined number of frames may be encoded to a precise bit target given the start and end parameters of how much data is contained in the decoder buffer.

It is yet another object of the present invention to provide a method for adjusting the contents of the buffer using the rate control algorithm when the target size is overrun or under run.

SUMMARY OF THE INVENTION

These and other objects of the invention are achieved by the method and the apparatus of the present invention. To splice new pictures into a digital stream, that stream having been compressed according to an MPEG compression standard, the information is collected on how much data will be contained in the constantly fluctuating decoding buffer at the start and at the end of the encoded data segment being replaced. Then the change in an average bits per data unit is calculated using the determined number of new pictures to be spliced in. The precise bit allocation for each new picture based on the data type, group of pictures (GOP) and other encoding parameters used in bit rate control is then calculated. New pictures are then spliced or encoded into the predetermined location in the encoded data stream.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Although this invention is applicable to numerous and various types of digital video compression standards, it has been found particularly useful in the environment of the MPEG-2 standard. Therefore, without limiting the applicability of the invention to the MPEG-2 standard, the invention will be described in such environment. Furthermore, while the present invention has been found particularly useful in the environment of video data, and described in such environment, this invention can also be applied to various other types of data, such as but not limited to audio data.

Figure 1:
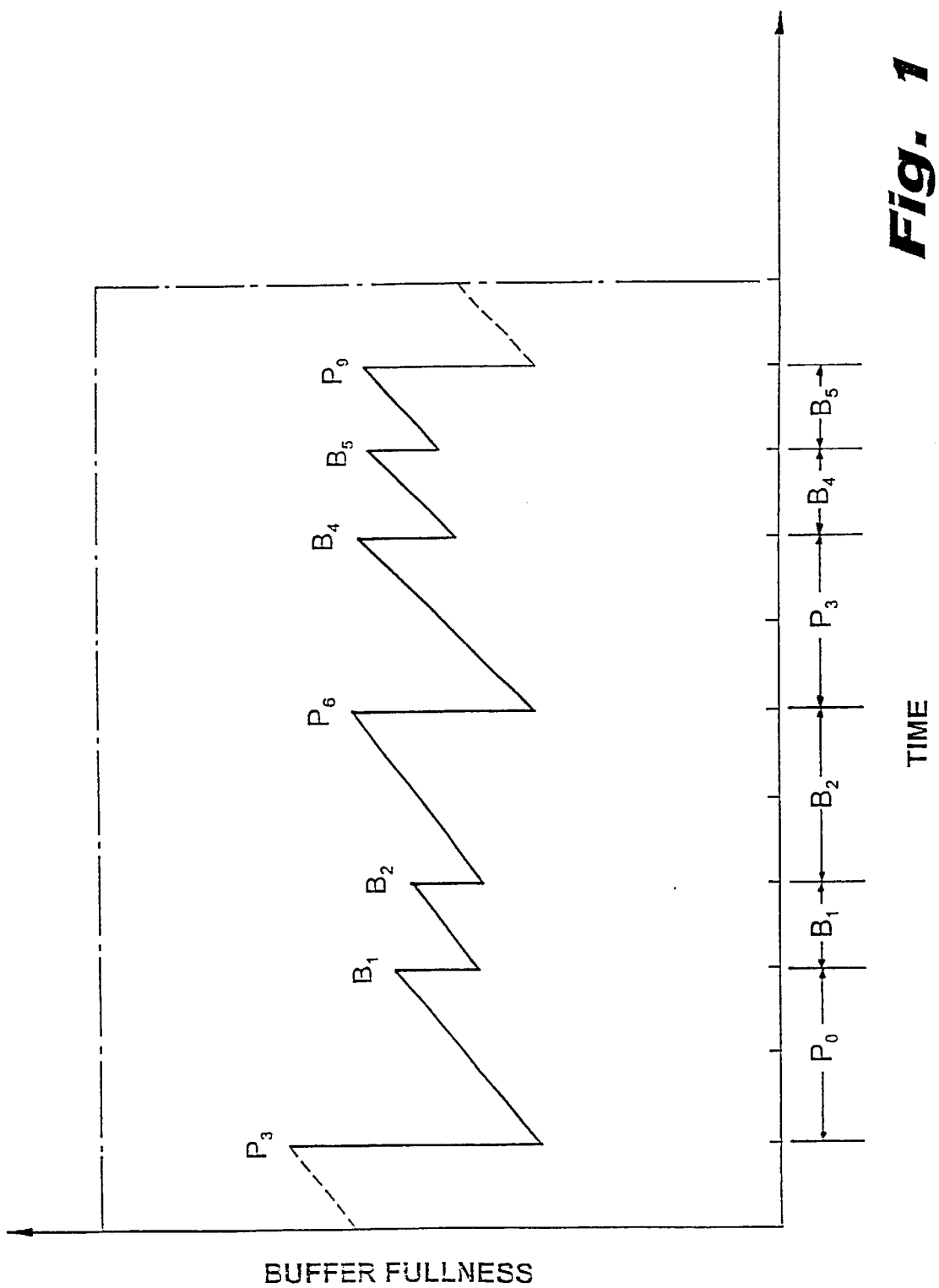
FIG. 1 shows a chart of how much data is contained in the buffer or buffer fullness over time, given a stream of data entering the buffer at a constant bit rate.

In MPEG video decoding, data buffering occurs to maintain a transmission bit rate and a video display rate. Pictures vary greatly in the amount of data used to encode them. Because of that, the decoding buffer constantly fluctuates with respect to how much data it contains (buffer fullness). FIG. 1 shows an example of the fluctuating buffer fullness over time graph with data coming in at a constant bit rate and the buffer read is assumed to be instantaneous. This buffer fullness of the decoding buffer must be carefully monitored to avoid buffer overruns or under runs, because of the adverse impact on video display.

To be certain that a given video sequence that is being encoded will not violate the buffer fullness, encoders create a "virtual buffer" by employing mathematical equations to determine how much data is entering and leaving a buffer at a given encode rate and at a given buffer size. Using an initial buffer fullness, which is the amount of data in the buffer at some starting point, the buffer fullness is continually measured at the completion of each encoded picture.

The calculation is made by taking the difference between the Initial Buffer Fullness and the accumulation of the difference of the pictures' actual bit usage and the average of bits per picture, assuming a constant picture target. This calculation is represented as follows Buffer Fullness = Initial Buffer Fullness−E where Initial Buffer Fullness=N*Buffer Size N is any number between 0.1 and 1.0, e.g., 0.8, the Buffer Size is given by the MPEG standard, and E=E+(Bits Used−Ba)

where E is initialized to 0 at start of the encode sequence and is accumulated for the entire video sequence, and Ba is average bits per picture.

In a video splice, the amount of data that must be used to encode new pictures to be spliced is determined by the state of the virtual buffer at the beginning of the splice (the start buffer fullness), and at the end of the splice (the end buffer fullness). The spliced pictures must fit into the free number of bits in the buffer precisely.

To begin the splice, the users garner the start and end buffer fullness statistics. If encoding of the whole stream is performed concurrently, then the statistics are available from the first pass encode of the video stream. If on the other hand, the encoding of the stream was completed without saving of start and end buffer fullness statistics, then these statistics can be attained by running the encoded stream through a stream analyzer. As is shown in box 10 of FIG. 2, these two parameters, along with the number of new pictures to be encoded and then inserted or spliced into the stream, are passed to the encoder in the second pass encode of the video stream.

Figure 2:
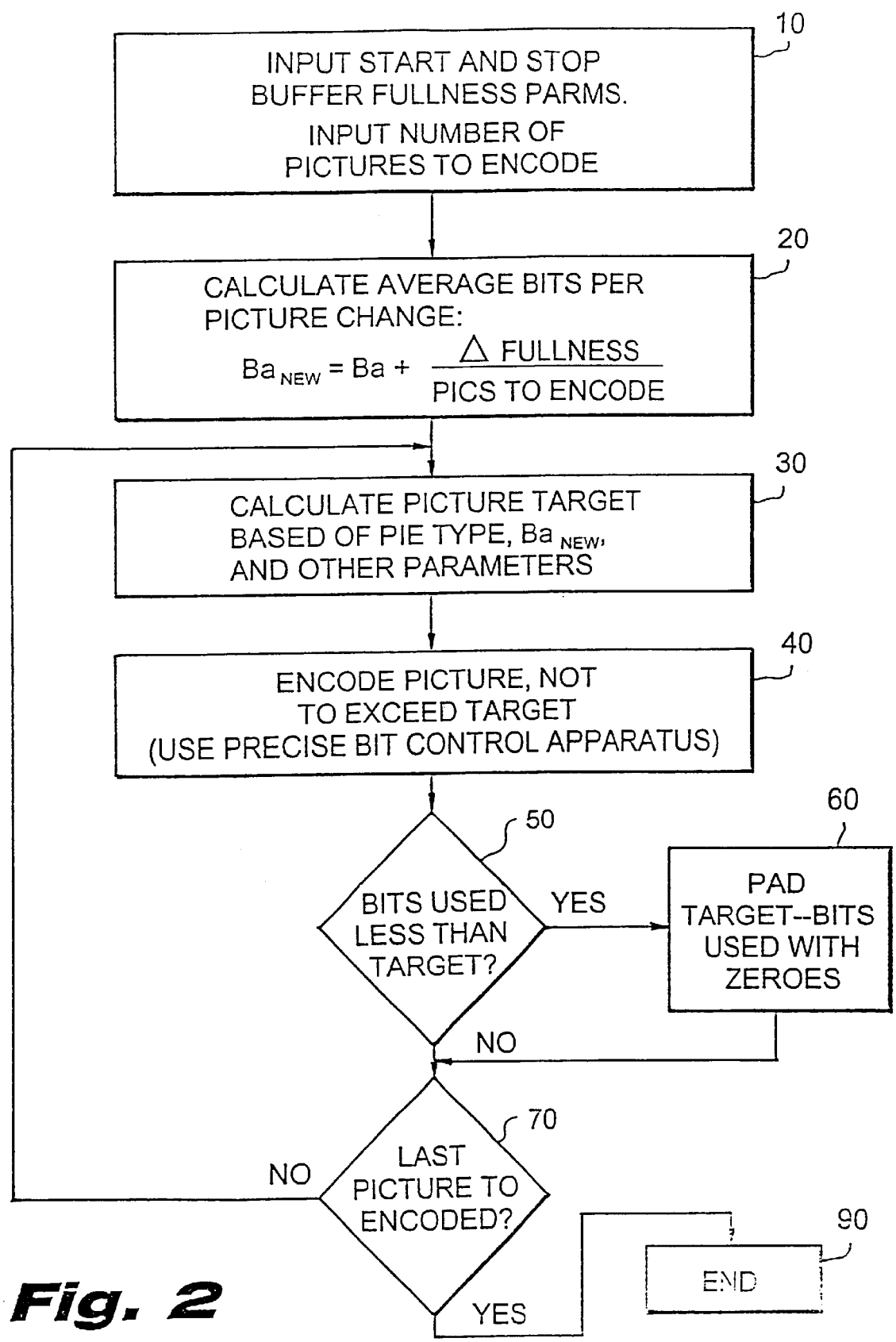
FIG. 2 shows a flow diagram of the buffer management for MPEG video splicing.

The encoder translates the buffer fullness and the picture numbers into average picture bits, FIG. 2 box 20, by converting the change in the number of free bits in the buffer at the start and at the end of splicing and dividing by the number of pictures to splice. These calculations are given by formulas:

The change in the Average Bits per picture based on picture splice is $$Ba(\text{new}) = Ba + \frac{(\text{End } BF - \text{Start } BF)}{\text{Number of Pictures to Encode}}$$

where BF is buffer fullness, Ba is the average bits per picture given constant picture target, and Ba(new) is the change in Ba based on pictures to splice. Ba is calculated by $$Ba = \frac{\text{Bit Rate(MBits/sec)}}{\text{Frame Rate(Pictures/sec)}}$$

As shown in FIG. 2 box 30, a precise bit allocation for each new picture is calculated by the encoder based on the picture type, group of pictures (GOP), and other encoding parameters used in bit rate control. In typical IPB encoding, I picture targets are 2 to 5 times larger than P picture targets and 4 to 10 times B picture targets. Picture target calculations are based on Ba, picture type, and other picture parameters such as picture condition and motion relative to other pictures.

To precisely attain these new picture targets FIG. 2 box 40, the present invention divides the picture by the number of macro blocks in the picture and the number of blocks in the macro block. The picture target is now subdivided into macro block targets $$\text{Target}(mb) = \frac{\text{Picture Target}}{\text{Number of Macro Blocks}}$$

The target is further reduced to Block Targets used to precisely control the number of bits used to encode a picture by $$\text{Target}(blk) = \frac{\text{Target }(mb)}{\text{Number of Blocks}}$$

This result is fed into an apparatus, which guarantees the picture target will not be overrun. Such apparatus is described in a related patent disclosure "A Precise Bit Control Apparatus with Look-ahead for MPEG Encoding" by John Murdock, et al, the entirety of which is incorporated by reference herein.

In FIG. 2 box 50 a determination is made whether a target bit size is reached. In the event the target is slightly under run (it will always be less than or equal to the target, never greater than the target), as shown in box 60, padding with zeroes ensures precise target attainment. The formula used is Pad Amount=Target−Bits Used where Pad Amount is greater than or equal to zero.

A decision box 70 determines whether there are any more pictures to encode. If there are no more pictures the process terminates with box 90. However, if there are still more pictures to encode, the process of this invention continuously loops to box 30 to calculate a precise bit allocation for each new picture while there are pictures to be encoded.

This newly encoded stream may now be seamlessly spliced into the original stream, occupying the location in the encoded stream of the portion which it replaces at the precise size given by users' input specification.

What is claimed is:

1. A method for splicing of new picture data into a digital video stream, that video stream having been compressed according to an MPEG compression standard, the method comprising the steps of:

attaining a start buffer fullness and end buffer fullness parameters of data in said digital video stream that is being replaced by new pictures, said start and end buffer fullness parameters being represented as a difference between an Initial Buffer Fullness and the accumulation (E) of the difference between the pictures' actual bit usage and the average of bits per picture (Ba), assuming a constant picture target, where $$Ba = \frac{\text{Bit Rate(MBits/sec)}}{\text{Frame Rate(Pictures/sec)}};$$

determining the number of new pictures to be spliced in;

calculating the change in an average bits per picture data unit, said calculation based on said start buffer and end buffer fullness parameters and a number of new pictures to be spliced, said change being calculated as Ba(new)

$$Ba(\text{new}) = Ba + \frac{(\text{End } BF - \text{Start } BF)}{\text{Number of New Pictures}};$$

calculating the precise bit allocation for each new picture based on said calculated average bits per data unit and a type of said new picture;

encoding the new picture data into the data stream so that the number of bits used does not exceed a target; and padding the new data if bits used to encode the new data into the data stream are fewer than the target.

2. The method of claim 1, wherein the

Initial Buffer Fullness=N*Buffer Size, where N is any number between 0.1 and 1.0, the Buffer Size is given by the MPEG standard, and E=E+(Bits Used−Ba), where E is initialized to 0 at start of the encode sequence and is accumulated for the entire video sequence, and Ba is average bits per picture.

3. The method of claim 1, wherein the calculation of the precise bit allocation for each new picture is based on the data type, group of pictures (GOP), and other encoding parameters used in bit rate control.

4. The method of claim 1, wherein the encoding step further includes the step of subdividing the picture target into macro block targets $$\text{Target}(mb) = \frac{\text{Picture Target}}{\text{Number of Macro Blocks}}$$

then the target is further reduced to Block Targets used to precisely control the number of bits used to encode a picture $$\text{Target}(blk) = \frac{\text{Target }(mb)}{\text{Number of Blocks}}$$

5. The method of claim 1, wherein if the bits used to encode the new data into the data stream are less than the target,.padding with zeroes will take place according to the following formula Pad Amount=Target−Bits Used where Pad Amount is greater than or equal to zero.

6. An apparatus for splicing of new picture data into a digital video stream, that video stream having been compressed according to an MPEG compression standard, the apparatus comprising:

the means for attaining a start buffer fullness and end buffer fullness parameters of data in said digital video stream that is being replaced by new picture data, said start and end buffer fullness parameters being represented as a difference between an Initial Buffer Fullness and the accumulation (E) of the difference between the pictures' actual bit usage and the average of bits per picture (Ba), assuming a constant picture target, where $$Ba = \frac{\text{Bit Rate(MBits/sec)}}{\text{Frame Rate(Pictures/sec)}};$$

the means for determining the number of new data pictures to be spliced in;

the means for calculating the change in an average bits per picture data unit, said calculation based on said start buffer and end buffer fullness parameters and a number of new pictures to be spliced, said change being calculated as $$Ba(\text{new}) = Ba + \frac{(\text{End } BF - \text{Start } BF)}{\text{Number of New Pictures}};$$

the means for calculating the precise bit allocation for each new picture data unit, said calculation based on said average bits per picture data unit and a type of said new picture data unit;

the means for encoding the new picture data into the video stream so that the number of bits used does not exceed a target; and the means for padding the new data if bits used to encode the new data into the data stream are fewer than the target.

7. The apparatus of claim 6, wherein the

Initial Buffer Fullness=N*Buffer Size, where N is any number between 0.1 and 1.0, the Buffer Size is given by the MPEG standard, and E=E+(Bits Used−Ba), where E is initialized to 0 at start of the encode sequence and is accumulated for the entire video sequence, and Ba is average bits per picture.

8. The apparatus of claim 6, wherein the calculation of the precise bit allocation for each new picture is based on the data type, group of pictures (GOP), and other encoding parameters used in bit rate control.

9. The apparatus of claim 6, wherein the means for encoding include the means for subdividing the picture target into macro block targets $$\text{Target}(mb) = \frac{\text{Picture Target}}{\text{Number of Macro Blocks}}$$

then the target is further reduced to Block Targets used to precisely control the number of bits used to encode a picture $$\text{Target}(blk) = \frac{\text{Target}(mb)}{\text{Number of Blocks}}.$$

10. The apparatus of claim 6, wherein if the bits used to encode the new data into the data stream are less than the target padding with zeroes will take place according to the following formula Pad Amount=Target−Bits Used where pad amount is greater than or equal to zero.

* * * * *